SCANNING CIRCUIT ARRANGEMENTS FOR MAGNETICALLY DEFLECTED
TELEVISION AND OTHER CATHODE RAY TUBES
Filed April 26, 1965

INVENTOR
Charles Raymond William Richardson
BY Baldwin & Wight
ATTORNEYS

United States Patent Office 3,385,996
Patented May 28, 1968

3,385,996

SCANNING CIRCUIT ARRANGEMENTS FOR MAGNETICALLY DEFLECTED TELEVISION AND OTHER CATHODE RAY TUBES

Charles Raymond William Richardson, Great Baddow, Essex, England, assignor to The Marconi Company Limited, London, England, a British company

Filed Apr. 26, 1965, Ser. No. 450,608
Claims priority, application Great Britain, Apr. 28, 1964, 17,654/64
5 Claims. (Cl. 315—19)

ABSTRACT OF THE DISCLOSURE

A scanning circuit arrangement for supplying deflecting current to magnetic deflecting windings of a magnetically deflectable cathode ray tube is disclosed herein in which the ray is to be deflected in scanning excursions with flybacks between them. The scanning circuit arrangement comprises a transformer and a switch for connecting the transformer across the supply points during scanning excursions. The transformer has a winding including two portions which are connected by a further switch. The two portions of the winding are automatically connected in series across the supply points during scanning excursions and are disconnected from each other, and from the supply points, during flyback periods so as to be in effective parallel during such periods so as to share the peak voltage between the two switches.

Figure 1:
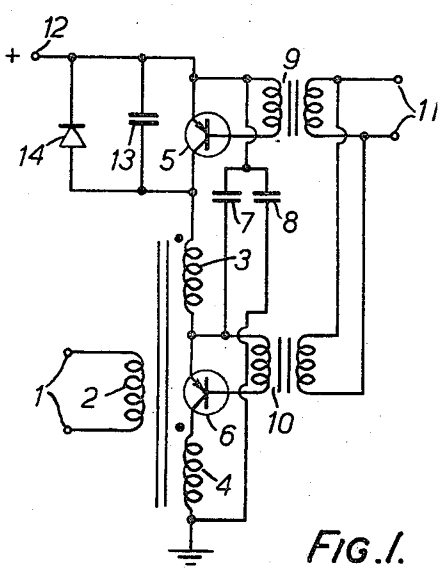

This invention relates to scanning circuit arrangements for magnetically deflected television and other cathode ray tubes.

In scanning arrangements in which the scanned area of a cathode ray tube is required to be scanned electromagnetically at high speed in a series of excursions each of which is followed by a so-called flyback, considerable practical difficulties arise in many cases because of the fact that the deflecting windings of the tube are inductive. Consider the case of a television cathode ray tube, the scanned area of which is required to be scanned electromagnetically in lines. The line frequency is high and because the deflecting windings are inductive and it is a requirement that the flyback time shall be very short compared to the line time—i.e., the time taken to make a line excursion—large voltages are set up across the said deflecting windings. The ratio of flyback voltage to scanning voltage depends on the ratio of line time to flyback time. If (the theoretically ideal case) the deflecting wave form is perfectly rectangular the two ratios are the same. If (the practical case) the said wave form is not perfectly rectangular the ratio of flyback voltage to scanning voltage is, for a given ratio of line time to flyback time, increased by a factor which depends upon the said wave form the said factor being, in the case of a sinusoidal wave form, $\pi/2$.

The occurrence of high flyback voltages across the deflecting windings leads to serious difficulty and limitation especially where large scanning powers and very short flyback times are required. In some cases they may make the use of a transistor for driving the deflecting windings impracticable with ordinary commercially available transistors, for the said windings will constitute the collector load of the transistor and high flyback voltages will be applied to the collector. The voltage which can be safely applied to the collector of a given transistor is, of course, limited and the flyback voltage across the deflecting windings may cause the safe collector voltage to be exceeded if the required scanning power is high and the flyback time short. If (the customary case) the deflecting windings are transformer coupled to the driving transistor circuit the transformation ratio must be so chosen that the flyback voltage, as transformed back and applied to the collector, is within the collector voltage rating of the said transistor. This determines the transformed scan voltage which, in the case considered, has to be supplied by the supply voltage source, since the transistor is "bottomed" during this period. With transistors as commercially generally available at the present time (such transistors have a permissible collector-emitter voltage in the neighbourhood of 120 volts) it has been general practice to use a 12 volt supply and to limit reduction of the flyback time to a value which keeps the flyback voltage to within the safe limit. The flyback time, so limited, is only just about acceptable in some cases: in others—especially where high scanning power is required—it is unsatisfactorily long. Moreover, the provision of a heavy current low voltage supply course is involved and this is a serious disadvantage mainly because of the need for copper conducting leads of large cross-section and careful bonding to earth in a number of places; the occurrence of heavy circulating currents; and the necessity of making decoupling capacitors of large size because, of course, the size of a decoupling capacitor varies inversely with the square of the supply voltage. All these considerations tend to increase size and cost and in these respects, and in others also, substantial practical advantages would follow reduction in supply current and increase in supply voltage in any given case.

According to this invention a scanning circuit arrangement for supplying deflecting current to magnetic deflecting windings of a magnetically deflectable cathode ray tube in which the ray is to be deflected in scanning excursions with flybacks between them comprises a transformer having a winding including a plurality of portions, and means for automatically connecting said portions in effective series (i.e. in series as respects A.C.) during scanning excursions and in effective parallel (i.e. in parallel as respects A.C.) during flyback periods.

The transformer may be one having separate primary and secondary windings or it may be an auto-transformer.

Preferably the automatic series and parallel connecting means include transistors connected and arranged to act as switching transistors. In this case the transistors preferably have their emitter and collector electrodes in circuit with the transformer winding the portions of which are to be switched from series to parallel and vice-versa, and simultaneous switching thereof is effected by applying to the bases thereof switching voltages derived from the normally provided scanning wave form source of the equipment.

Figure 2:
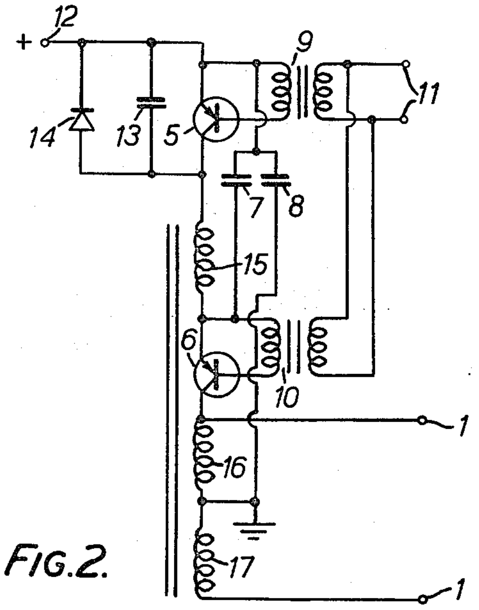

The invention is illustrated in the accompanying drawings which show diagrammatically two embodiments thereof, FIGURE 1 showing an embodiment employing a transformer with separate primary and secondary windings and FIGURE 2 showing an embodiment using an auto-transformer.

Referring to FIGURE 1, the electro magnetic deflecting windings (not shown) of a television cathode ray tube are fed by connection at terminals 1 from the secondary 2 of a transformer. The primary of the transformer consists of two portions 3 and 4 which are inter-connected by means including two similar transistors 5 and 6. The senses of winding of the portions 3 and 4 are indicated in the usual conventional manner by dots. 7 and 8 are de-coupling condensers. The transistors 5 and 6 are normally (i.e. during scanning line excursions) conductive, but during flyback periods they are rendered non-conductive by voltages applied to their bases through transformers 9 and 10, the primaries of which are in parallel and are fed from the normally provided driving scanning wave form source (not shown) which is connected at terminals 11. Condenser 13 is dimensioned to act as a tuning condenser for the deflecting windings of the tube and is choosen in accordance with well known practice to tune said windings to the flyback frequency taking into account, of course, the total effective inductive and reactive values in the tuned circuit. The transformer consisting of the windings 2, 3, 4 is tightly coupled. Both transistors have the same nominal voltage ratings and the number of turns in each of the portions 3 and 4 is the same.

With this arrangement, the portions 3 and 4 are, during scanning excursions, connected effectively in series between the supply terminal 12 and the earth by the two transistors. In this condition the emitter of transistor 6 will assume a potential which is half that of the supply and equal voltages will be developed across each portion 3 and 4. The decoupling condenser 7 maintains this potential constant. During this period a constant voltage is produced across the tube deflecting windings and the current therein increases substantially linearly. At the end of the excursion the transistors 5 and 6 are rendered non-conductive together, i.e. are switched off. The deflecting windings in effective parallel with the tuning capacity provided by condenser 13 as transformed by the transformer 2–3–4 are now open circuited. Rapid decrease in deflecting current occurs and a large amplitude sinusoidal voltage is produced across the said deflecting windings. This voltage is prevented from reversing in polarity at the end of the first half cycle by the action of the diode 14 which acts as a so-called recovery diode in manner well known per se. The large amplitude sinusoidal pulse produced across the deflecting windings is transformed by the transformer 2–3–4 and appears on the collectors of transistors 5 and 6. The collector voltage wave forms of these transistors are the same each being equal to half the total primary voltage amplitude. The decoupling condenser 7 insures that the emitter potential of transistor 6 remains constant duri..g flyback.

It will be seen that because during flyback the winding portions 3 and 4 are effectively in parallel the collector voltages on the transistors 5 and 6 are, during this period, reduced in effect by the factor of two.

In many cases the invention will enable commercially available transistors to be used where the required scanning power and the required ratio of scan excrusion time to flyback time are so large that an ordinarily commercially available transistor could not be used in a known circuit arrangement not embodying the invention for the invention enables the flyback time to be substantially reduced below that which would be otherwise permissible.

FIGURE 2 will, it is throught, be practically self-explanatory having regard to the description already given of FIGURE 1. Like references are used for like parts in FIGURES 1 and 2. The essential difference between the two figures is that in FIGURE 2 the transformer 2–3–4 of FIGURE 1 is replaced by an auto transformer having three windings 15, 16, 17.

Well known expedients as employed with known scanning circuit arrangements may also be employed when practising this invention. Thus, for example, in addition to simple tuning of the deflecting windings of the tube to produce a sinusoidal wave form, other tuned inductances may be coupled to superimpose on the collector of the transistors a harmonic of the flyback frequency preferably the third harmonic. If this is done, it will obviously still further reduce the maximum voltages applied to the collectors of the transistors. Also, again in accordance with practice known per se, the transformer through which the deflecting windings are fed may be provided with an additional winding for the purpose of generating E. H. T. Thus, in FIGURE 1 an additional winding for the generation of E. H. T. could be provided in series with the portions 3 and 4. If this be done, the recovery diode 14 will usually not be necessary. It is not though necessary to describe this and other possible modifications further, since they are per se in accordance with well known practice.

I claim:

1. A scanning circuit arrangement for supplying deflecting current to magnetic deflecting windings of a magnetically deflectable cathode ray tube in which the ray is to be deflected in scanning excursions with flybacks between them said arrangement comprising a transformer having a winding including a plurality of portions, and means for automatically connecting said portions in effective series during scanning excursions and in effective parallel during flyback periods.

2. An arrangement as claimed in claim 1 wherein the transformer has separate primary and secondary windings.

3. An arrangement as claimed in claim 1 wherein the transformer is an auto-transformer.

4. An arrangement as claimed in claim 1 wherein the automatic series and parallel connecting means include transistors connected and arranged to act as switching transistors.

5. An arrangement as claimed in claim 4 wherein the transistors have their emitter and collector electrodes in circuit with the transformer winding the portions of which are to be switched from series to parallel and vice-versa, and simultaneous switching thereof is effected by applying to the bases thereof switching voltages derived from the normally provided scanning wave form source.

References Cited

UNITED STATES PATENTS 2,821,657 5/1955 Newhouse ----------- 315—27

RODNEY D. BENNETT, *Primary Examiner.*

RICHARD A. FARLEY, *Examiner.*

B. L. RIBANDO, *Assistant Examiner.*